US009831752B2

(12) United States Patent
Dien

(10) Patent No.: US 9,831,752 B2
(45) Date of Patent: Nov. 28, 2017

(54) ELECTRIC MACHINE

(71) Applicant: Ghing-Hsin Dien, Taipei (TW)

(72) Inventor: Ghing-Hsin Dien, Taipei (TW)

( * ) Notice: Subject to any disclaimer, the term of this patent is extended or adjusted under 35 U.S.C. 154(b) by 685 days.

(21) Appl. No.: 14/262,688

(22) Filed: Apr. 25, 2014

(65) Prior Publication Data

US 2014/0319954 A1     Oct. 30, 2014

(30) Foreign Application Priority Data

Apr. 30, 2013   (TW) .............................. 102115499 A

(51) Int. Cl.
*H02K 1/16*     (2006.01)
*H02K 19/10*    (2006.01)
*H02K 21/12*    (2006.01)

(52) U.S. Cl.
CPC ........... *H02K 19/103* (2013.01); *H02K 21/12* (2013.01); *H02K 2201/12* (2013.01)

(58) Field of Classification Search
CPC ... H02K 19/103; H02K 21/12; H02K 2201/12
USPC ......................................................... 310/208
See application file for complete search history.

(56) References Cited

U.S. PATENT DOCUMENTS

| | | | | |
|---|---|---|---|---|
| 4,563,602 A * | 1/1986 | Nagasaka | ............... | H02K 41/03 310/12.17 |
| 5,117,142 A * | 5/1992 | von Zweygbergk | . | H02K 21/125 310/112 |
| 5,854,521 A * | 12/1998 | Nolle | ................... | H02K 21/125 310/12.22 |
| 6,548,920 B2 | 4/2003 | Joong et al. | | |
| 6,700,229 B2 * | 3/2004 | Sadarangani | ............. | F02B 1/12 310/12.12 |
| 7,459,822 B1 | 12/2008 | Johnson et al. | | |
| 7,859,141 B2 * | 12/2010 | Sadarangani | ........ | H02K 21/125 310/12.24 |
| 7,924,128 B2 * | 4/2011 | Ito | ......................... | B66B 1/3476 310/12.11 |
| 2007/0267929 A1 | 11/2007 | Pulnikov et al. | | |
| 2008/0018189 A1 * | 1/2008 | Dooley | ................. | H02K 1/165 310/156.01 |

(Continued)

FOREIGN PATENT DOCUMENTS

| | | |
|---|---|---|
| JP | 2013-66347 A | 4/2013 |
| TW | 561670 | 11/2003 |

OTHER PUBLICATIONS

Translation of foreign patent document JP 2013066347 (Year: 2013).*

*Primary Examiner* — Alex W Mok
(74) *Attorney, Agent, or Firm* — Cheng-Ju Chiang

(57) ABSTRACT

An electric machine includes a stator and a rotor. The stator is disposed near to the rotor and has at least one first stator unit and at least one second stator unit. The first stator unit has a first tooth and a second tooth, and the second stator unit has a third tooth and a fourth tooth. The rotor has a rotating direction or a moving direction with respect to the stator. The first tooth and the third tooth are adjacently disposed to each other along the rotating direction or the moving direction. The protruding directions of the first tooth and the third tooth respectively form a first angle and a third angle with the radial direction of the rotor, and the first angle and the third angle are different.

11 Claims, 25 Drawing Sheets

(56) References Cited

U.S. PATENT DOCUMENTS

| | | | |
|---|---|---|---|
| 2008/0211326 A1* | 9/2008 | Kang | H02K 21/145 310/44 |
| 2008/0307633 A1* | 12/2008 | Makino | H02K 3/34 29/596 |
| 2010/0033033 A1 | 2/2010 | Johnson et al. | |
| 2010/0295410 A1 | 11/2010 | Calley | |
| 2011/0062723 A1* | 3/2011 | Calley | H02K 1/246 290/1 R |

* cited by examiner

ELECTRIC MACHINE

CROSS REFERENCE TO RELATED APPLICATIONS

This Non-provisional application claims priority under 35 U.S.C. §119(a) on Patent Application No(s). 102115499 filed in Taiwan, Republic of China on Apr. 30, 2013, the entire contents of which are hereby incorporated by reference.

BACKGROUND OF THE INVENTION

Field of Invention

The present invention relates to an electric machine.

Related Art

The electric machine is the most commonly used driving device. According to the functions, the electric machine can be divided into the motor and generator. In particular, the motor can convert the electric or magnetic power into mechanical power, and it has been widely applied to the machines of various fields.

In general, the motor includes a rotor and a stator, and the rotor can be driven to rotate by the magnetic flux between the stator and rotor so as to generate the required mechanical energy. In order to provide the path for magnetic flux, the conventional motor is configured with a plurality of stator teeth, and the coil for cooperating with the inner rotor is wound in the stator slots disposed between the stator teeth. However, this kind of electric machine has some drawbacks. For example, most coils can not be wound inside the stator slots in advance, so that the manufacturing speed can not be improved and the production cost can not be reduced. Moreover, the conventional design of the stator slots provides a gap between the teeth for winding coils during the manufacturing process. In other words, a stator slot opening is configured between the stator teeth. These gaps will cause the cogging torque as the rotor rotates, which results in the unsmooth rotation of the rotor.

In more details, the cogging torque is mainly caused by the variation of the magnetic attraction between the rotor and the stator teeth, and is related to the stator slot openings. When the coil disposed on the stator slot is applied with current, each stator tooth will generate a corresponding magnetic pole, thereby generating the expected magnetic attraction. The maximum magnetic attraction can be generated as the rotor's magnetic flux surface is facing directly toward the stator tooth. Afterwards, when the rotor starts to rotate and the magnetic lines pass through the stator slot opening (that is, the rotor rotates from the position facing directly toward the stator tooth to the position slanting to the stator tooth), the rotation of the rotor will be dragged by the magnetic attraction change, which is called the cogging torque. The cogging torque may cause some drawbacks such as the unsmooth operation of the motor, back EMF, noise (due to teeth vibration), lower torque output, and the likes. Moreover, in the generator application, the cogging torque will cause a resistance as the generator is starting or rotating, thereby affecting the efficiency of the generator. Therefore, it is desired to minimize the cogging torque and its effect in the electric machine.

As mentioned above, the conventional improvement method for minimizing the cogging torque is to modify the stator structure of the electric machine. For example, using the axial motor and the stator teeth are fabricated by casting, and then assembled so as to minimize the gaps between the stator teeth. However, although this approach can reduce the effect of the cogging torque, it is still not commonly used due to the high cost of the casting procedure. Another approach is to use the radial motor and place a staggered winding over a plurality of stator teeth. However, this approach requires a complex coil winding, which is complicated in manufacturing. Besides, the length of the coil is longer and multiple teeth must be driven at the same time, which requires higher driving voltage. Furthermore, the electric machine made by this approach still has a certain cogging torque. Alternatively, it is possible to design a slotless electric machine by using complex windings only to form the stator. Although this design does not need the casting procedure for fabricating the stator, the complex and expensive staggered coil windings are still needed.

Therefore, it is an important subject to provide an electric machine that can wind the coil in advance and has minimized cogging torque, simple structure, low cost and higher efficiency.

SUMMARY OF THE INVENTION

To achieve the above subject, an objective of the present invention is to provide an electric machine with reduced cogging torque. Another objective of the present invention is to provide an electric machine with low magnetic loss. A further objective of the present invention is to provide an electric machine that is low-cost and can be easily manufactured and assembled.

To achieve the above objectives, the present invention discloses an electric machine including a rotor and a stator. The stator is disposed near to the rotor and includes at least one first stator unit and at least one second stator unit. The first stator unit has a first tooth and a second tooth, while the second stator unit has a third tooth and a fourth tooth. The rotor has a rotating direction or a moving direction with respect to the stator. The first tooth of the first stator unit and the third tooth of the second stator unit are adjacently and alternately disposed to each other along the rotating direction or the moving direction. The protruding directions of the first tooth and the third tooth respectively form a first angle and a third angle with a radial direction of the rotor, and the first angle and the third angle are different.

To achieve the above objectives, the present invention also discloses an electric machine including a rotor and a stator. The stator is disposed near to the rotor and includes at least one first stator unit and at least one second stator unit, which are disposed adjacent to each other. The first stator unit has a first tooth and a second tooth, while the second stator unit has a third tooth and a fourth tooth. The rotor has a rotating direction or a moving direction with respect to the stator. The first tooth of the first stator unit and the third tooth of the second stator unit are adjacently and alternately disposed to each other along the rotating direction or the moving direction. The protruding lengths of the first tooth and the third tooth are different.

To achieve the above objectives, the present invention further discloses an electric machine including a rotor and a stator. The stator is disposed near to the rotor and includes at least one first stator unit and at least one second stator unit, which are disposed adjacent to each other. The first stator unit and the second stator unit are adjacently and alternately disposed to each other along a rotating direction or a moving direction of the rotor, and they are misaligned along the direction.

As mentioned above, the electric machine of the invention has a novel design or arrangement of the stator units, thereby achieving the goal of minimized cogging torque, lower magnetic loss, simple structure, reduced cost and higher efficiency.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references refer to the same elements.

Figure 1A:
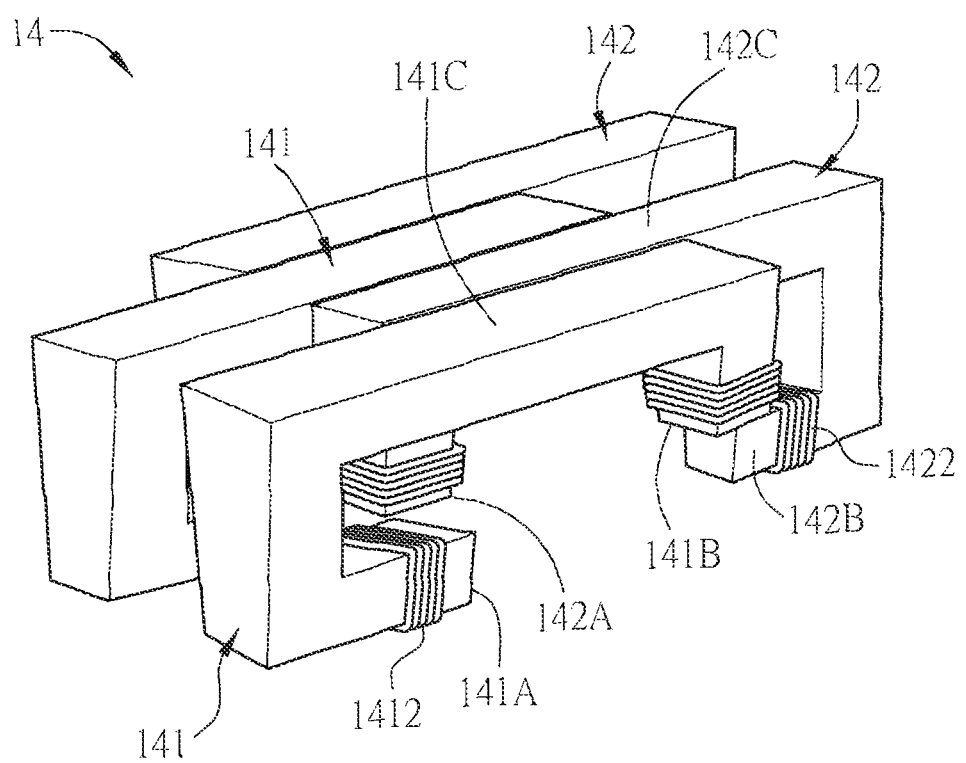
FIG. 1A is a schematic diagram showing a stator according to a first embodiment of the invention.
Figure 1B:
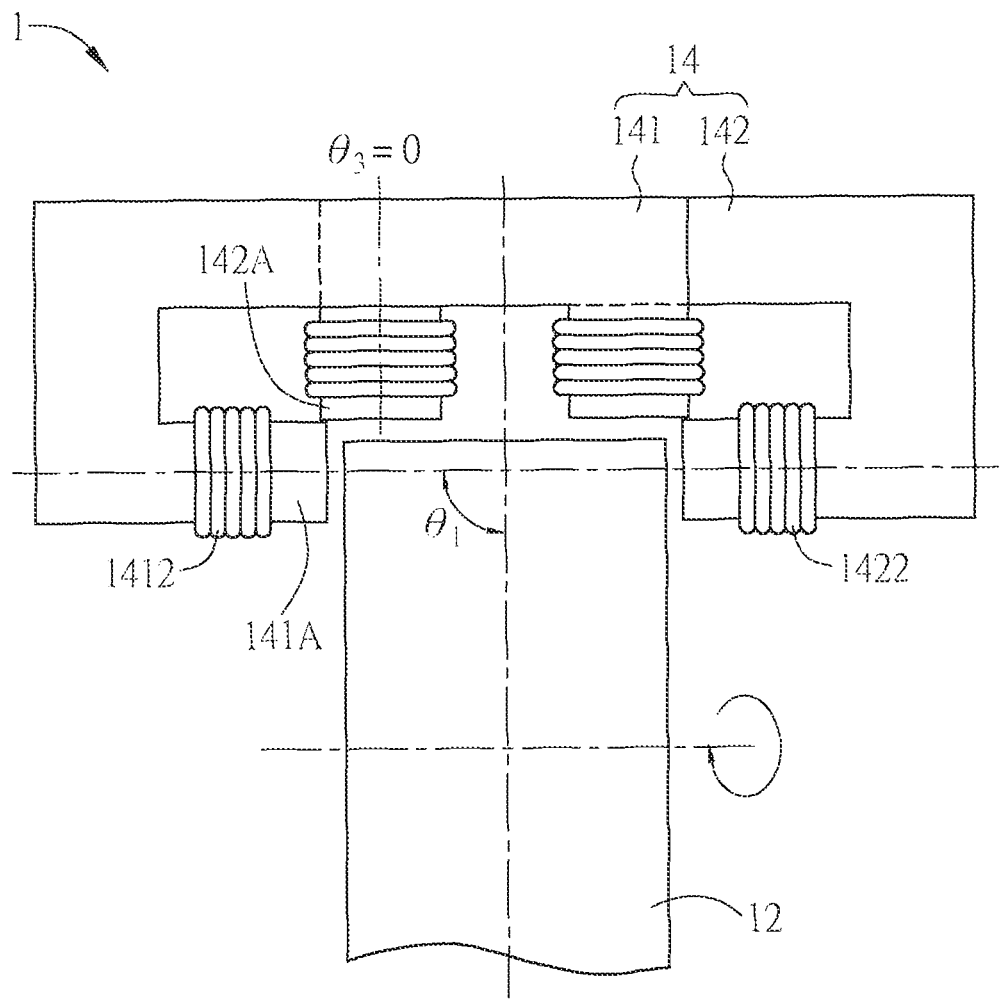
FIG. 1B is a front view of the stator of FIG. 1A.
Figure 1C:
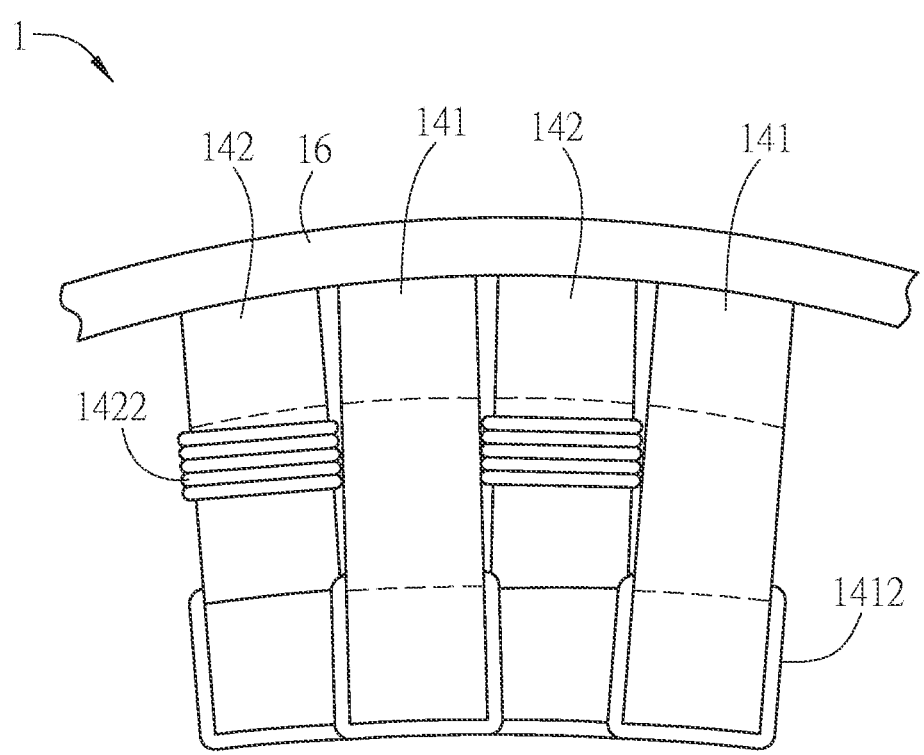
FIG. 1C is a side view of the stator of FIG. 1A.

FIGS. 1A to 1C are schematic diagrams, a front view and a side view of a stator according to a first embodiment of the invention.

Referring to FIGS. 1A to 1C, an electric machine 1 according to a first embodiment of the invention includes a rotor 12 and a stator 14. The stator 14 is disposed near to the rotor 12, and includes at least a first stator unit 141 and at least a second stator unit 142, and the stator units are adjacently disposed or adjacently arranged. For the sake of easy description, the figures only show two first stator units 141 and two second stator units 142, and the magnets inside the rotor 12 are omitted. The first stator unit 141 and the second stator unit 142 are alternately arranged or misaligned. Besides, the first stator unit 141 and the adjacent second stator unit 142 are tightly placed together and substantially have no gap therebetween.

To be noted, the term "adjacently disposed" or "adjacently arranged" means that the stator units 141 and 142 are disposed along the rotation direction of the outer edge of the rotor 12, and they can be arranged in contact or not. The term "misaligned" means that the geometrical centers of the adjacent stator units 141 and 142 are misaligned with respect to the radial direction, axial direction or moving direction of the rotor. In other words, the relative position of the geometrical center of any one of the stator units with respect to the radial direction, axial direction or moving direction of the rotor is different from the relative position of the geometrical center of its adjacent stator unit. The term "alternately disposed" or "alternately arranged" means that the first stator unit 141 is located between two second stator units 142, and the second stator unit 142 is located between two first stator units 141. In addition, the number of stator units contained in the stator 14 is not limited. Although this embodiment discloses two first stator units 141 and two second stator units 142, this invention is not limited thereto. For example, another embodiment may configure a plurality of first stator units 141 and a plurality of second stator units 142, which form a closed loop (see FIG. 1D).

In this embodiment, each of the first stator unit 141 and the second stator unit 142 includes two L-shaped magnetic yoke bodies, and the two ends of each yoke body are equipped with two protruding teeth, respectively. Herein, the first stator unit 141 includes an L-shaped first body 141C, and a first tooth 141A and a second tooth 141B are extended from two ends of the first body 141C, thereby forming a C-shaped magnetic yoke. The second stator unit 142 includes a L-shaped first body 142C, and a third tooth 142A and a fourth tooth 142B are extended from two ends of the second body 142C, thereby forming a C-shaped magnetic yoke.

In addition, the first stator unit 141 further has at least one coil 1412, while the second stator unit 142 further has at least one coil 1422. Herein, the first teeth 141A of the first stator units 141 and the third teeth 142A of the second stator units 142 are adjacently and alternately disposed.

In addition, the position of each of the coils 1412 and 1422 is different from the radial relative position of the rotor 12. The coil 1412 is wound on at least one of the first tooth 141A, the second tooth 141B or the first body 141C, while the coil 1422 is wound on at least one of the third tooth 142A, the fourth tooth 142B or the second body 142C. In this embodiment, the C-shaped magnetic yoke is preferably applied to an axial-flux and radial-flux motor.

In this embodiment, two coils 1412 are provided to wind on the first tooth 141A and the second tooth 141B, and two coils 1422 are provided to wind on the third tooth 142A and the fourth tooth 142B. Herein, the relative positions of the coils 1412 and 1422 wound on the first tooth 141A and the third tooth 142A with respect to the radial direction of the rotor 12 are different. To be noted, the positions and numbers of the wound coils 1412 and 1422 are not limited to the above embodiment. Alternatively, each stator unit may be configured with only a single coil.

As mentioned above, the first stator unit 141 and the second stator unit 142 are independent units, so that they can be individually manufactured (e.g. composed of metal sheets made by stamping process) and do not need the conventional stator slot and the stator slot opening. Besides, the coils can be wound on the first stator unit 141 and the second stator unit 142 in advance, and the stator units are then assembled. Or, the coils can be wound into the desired shapes and then mounted on the teeth. This approach can further speed up the manufacturing process.

The rotor 12 has a rotating direction or a moving direction with respect to the stator 14. The rotating direction (or moving direction) is the moving direction of the outer edge of the rotor 12 with respect to the stator 14. The first tooth 141A of the first stator unit 141 and the third tooth 142A of the second stator unit 142 are adjacently disposed to each other along the rotating direction or the moving direction. Referring to FIG. 1B, the protruding directions (the center lines) of the first tooth 141A and the third tooth 142A respectively form a first angle $\theta_1$ and a third angle $\theta_3$ with the radial direction of the rotor 12. In this embodiment, the third angle $\theta_3$ is zero, which means that the protruding direction of the third tooth 142A is parallel to the radial direction of the rotor 12. Those teeth having the same included angles with respect to the radial direction of the rotor 12 form a non-continuous magnetic flux surface (for example, two first tooth 141A of two different stator units 141). In this embodiment, the first tooth 141A and the third tooth 142A are facing to the rotor 12 so as to form two magnetic flux surfaces. When the coils on the first stator unit 141 and the second stator unit 142 are applied with current, an attraction force or a repulsion force can be generated to the rotor 12.

To be noted, the term "protruding direction" represents the extending direction of the tooth from the magnetic yoke body. The radial direction of the rotor and the protruding direction of any tooth can define an included angle.

The adjacent first tooth 141A and third tooth 142A are substantially connected or substantially have no gap therebetween along the rotating direction or the moving direction. The adjacent second tooth 141B and fourth tooth 142B are substantially connected or substantially have no gap therebetween along the rotating direction or the moving direction. In this embodiment, the first tooth 141A and the third tooth 142A form a non-continuous magnetic flux surface with no gap, and the second tooth 141B and the fourth tooth 142B form another non-continuous magnetic flux surface with no gap.

Referring to FIGS. 1A to 1C, the first stator unit 141 and the second stator unit 142 are alternately arranged on a plane, and a heat dissipation plate 16 (see FIG. 1C) is also configured on the plane for improving the heat dissipation efficiency of the electric machine.

In the above configuration, when the rotor 12 rotates or moves along the stator 14, the vertical magnetic flux areas between the rotor 14 and the first and second stator units 141 and 142 of the stator 14 substantially remains unchanged, or has a magnetic flux variation lower than the conventional electric machine (e.g. the peak of the variation is lower than 10% of the average magnetic flux). In other words, this configuration can effectively reduce the cogging torque so as to improve the entire efficiency of the electric machine and reduce the power loss.

Figure 1D:
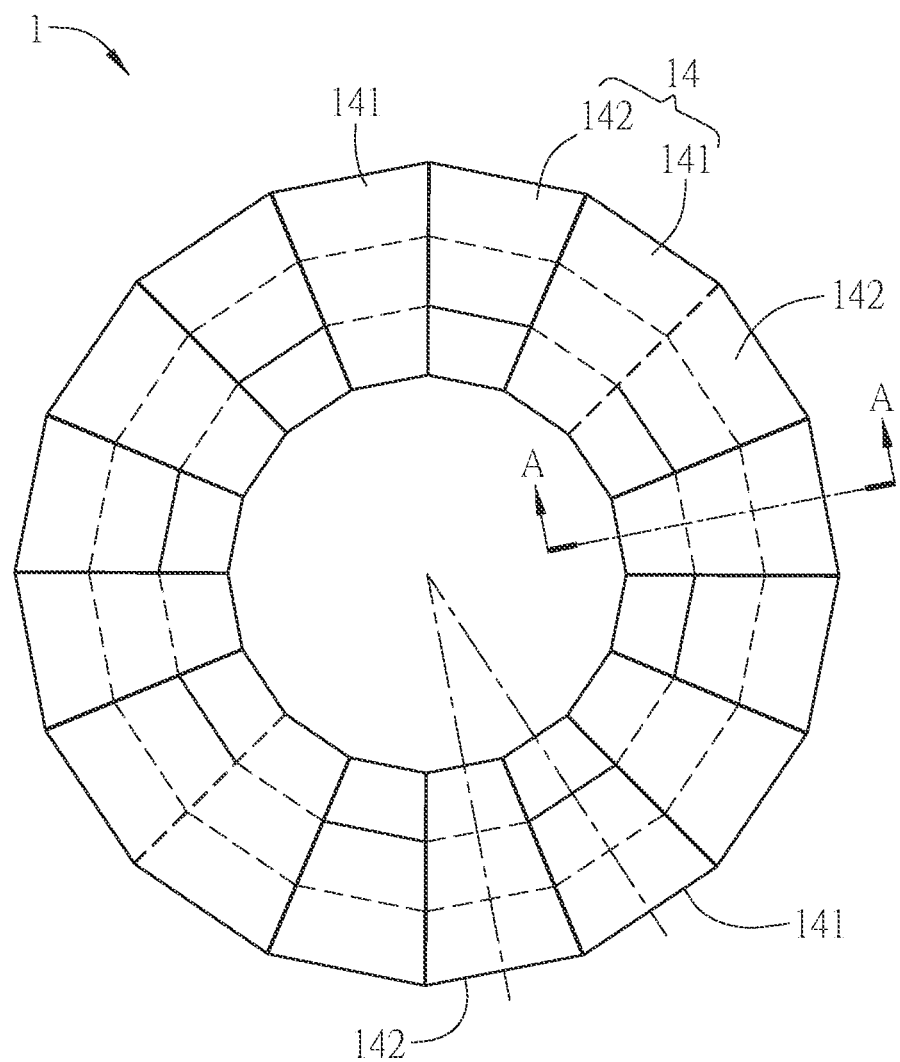
FIG. 1D is a side view of an electric machine according to the first embodiment of the invention.

FIG. 1D is a side view of the electric machine 1 according to the first embodiment of the invention, wherein the sectional view along the line AA of FIG. 1D is similar to FIG. 1B. Referring to FIG. 1D, the stator units of this embodiment have different radial directions with respect to the center of the rotor 12 (see the dotted lines). Each of the radial directions can define an included angle with the protruding direction of any tooth. The relative positions and relationships of the first and second stator units are clear and will not be described herein. For the sake of clear illustration, the rotor 12 as well as other components of the electric machine 1 is omitted, but those skilled in the art can still realize the invention from the figure.

When this embodiment is applied to an electric machine (e.g. a motor), the first stator units 141 and the second stator units 142 are arranged in sequence to form a closed circle. As shown in FIG. 1A to 1D, the cross sectional thicknesses of the first stator units 141 or the second stator units 142 are not uniform. Wherein, the outer edge of the stator units 141 and 142 is thicker. That is, the portions of the stator units 141 and 142 closer to the axis of the rotor 12 (not shown) are thinner. Of course, the invention may have different aspects such that the stator units are arranged in a row, a curved line or a closed path. In brief, the thicknesses of the stator units 141 and 142 of the invention can be adjusted according to different requirements and arrangements, thereby achieving the similar desired effect.

Figure 2A:
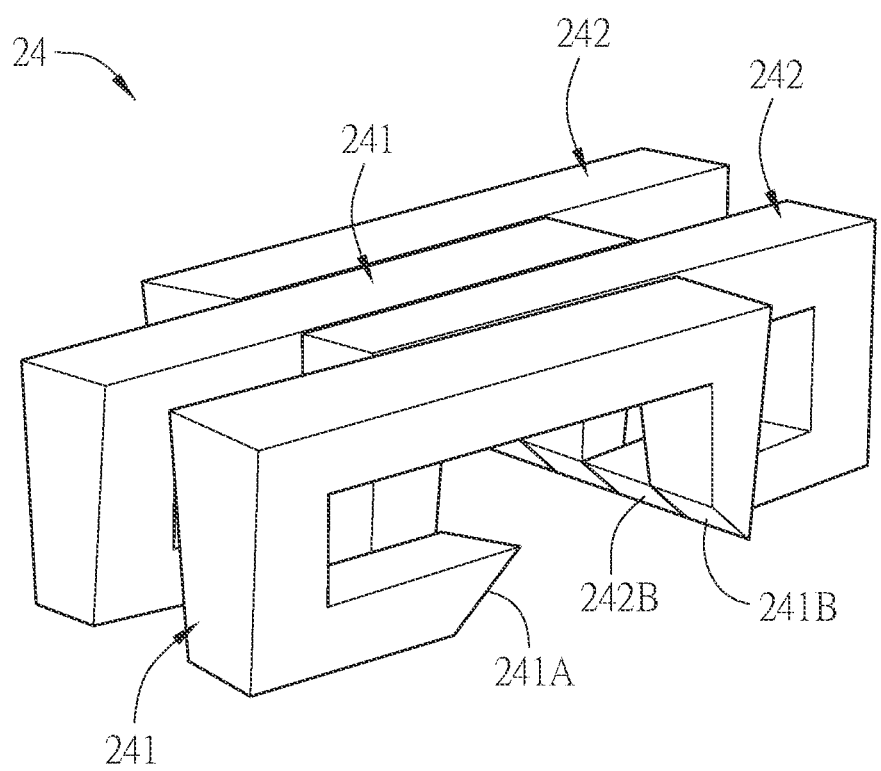
FIG. 2A is a schematic diagram showing a stator according to a second embodiment of the invention.
Figure 2B:
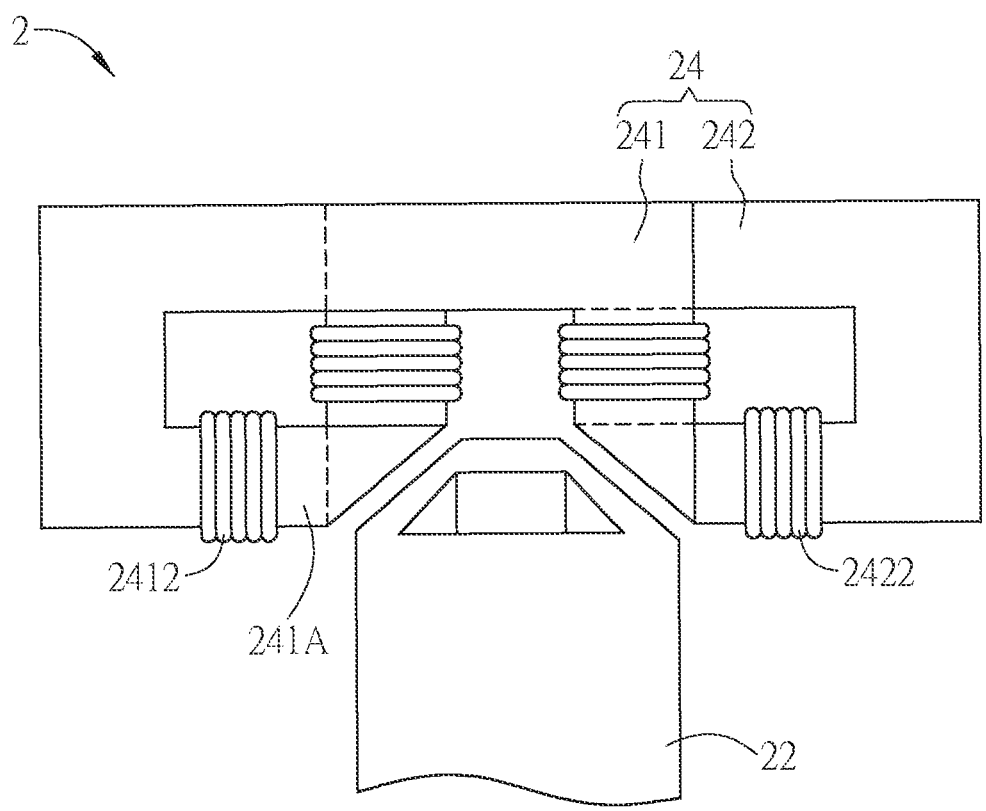
FIG. 2B is a front view of the stator of FIG. 2A in cooperate with a rotor.

FIG. 2A is a schematic diagram showing a stator 24 according to a second embodiment of the invention, and FIG. 2B is a front view of the stator 24 of FIG. 2A in cooperate with a rotor 22. For the sake of clear illustration, the coils 2412 and 2422 of the first stator unit 241 and the second stator unit 242 are omitted in FIG. 2A, and the winding methods thereof can be referred to FIG. 2B. FIG. 2B also shows a magnet (not labeled) embedded in the rotor 22, so that it will not be detached from the rotor 22 in high-speed rotation and can provide a uniform magnetic force for operation.

Different from the first embodiment, the front ends of the teeth of the first stator units 241 and the second stator units 242 of the stator 24 have slanted surfaces. In other words, the front ends of the first tooth 241A of the first stator unit 241 and the third tooth 242A of the second stator unit 242, which are adjacently disposed, substantially align to a coplanar surface, thereby forming a substantially continuous magnetic flux surface. Similarly, the front ends of the second tooth 241B and the fourth tooth 242B also substantially align to a coplanar surface, thereby forming a continuous magnetic flux surface.

Referring to FIG. 2B, one end of the rotor 22 of the embodiment close to the stator 24 has a wedge shape, but the invention is not limited thereto. Furthermore, in order to obtain the maximum magnetic flux, the rotor 22 is configured with a surface parallel to the magnetic flux surface of the first stator unit 241 and the second stator unit 242.

The other components and the relationships between the components of this embodiment are similar to the first embodiment, so their detailed description will be omitted.

Figure 3A:
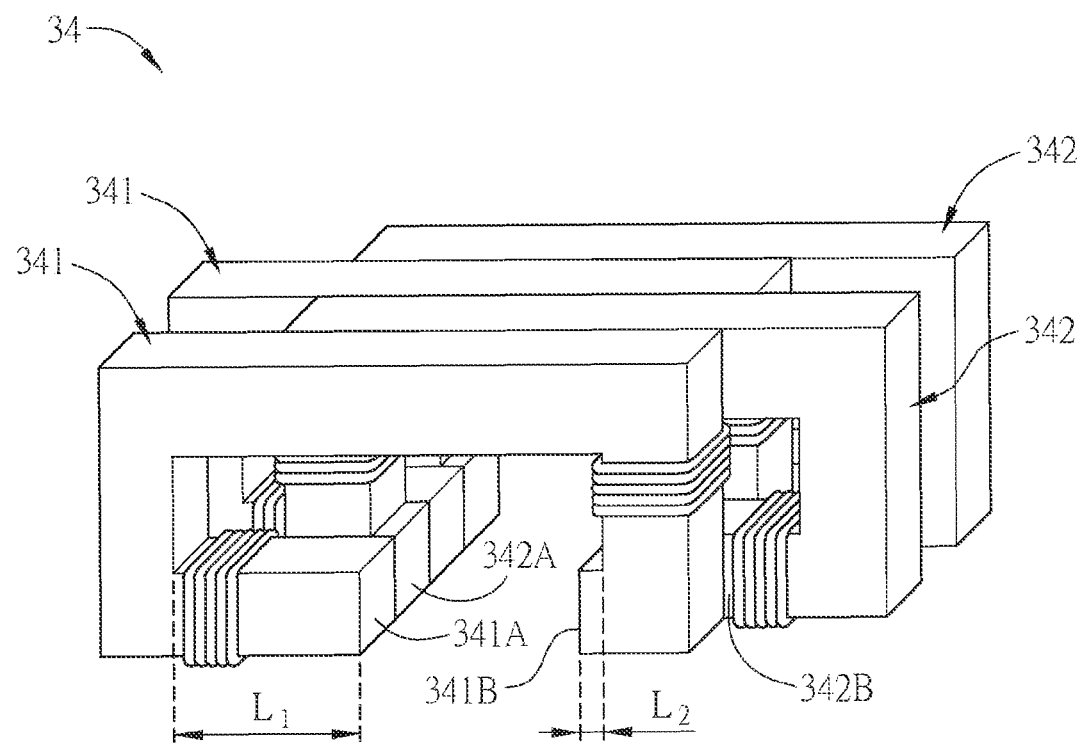
FIG. 3A is a schematic diagram showing a stator according to a third embodiment of the invention.
Figure 3B:
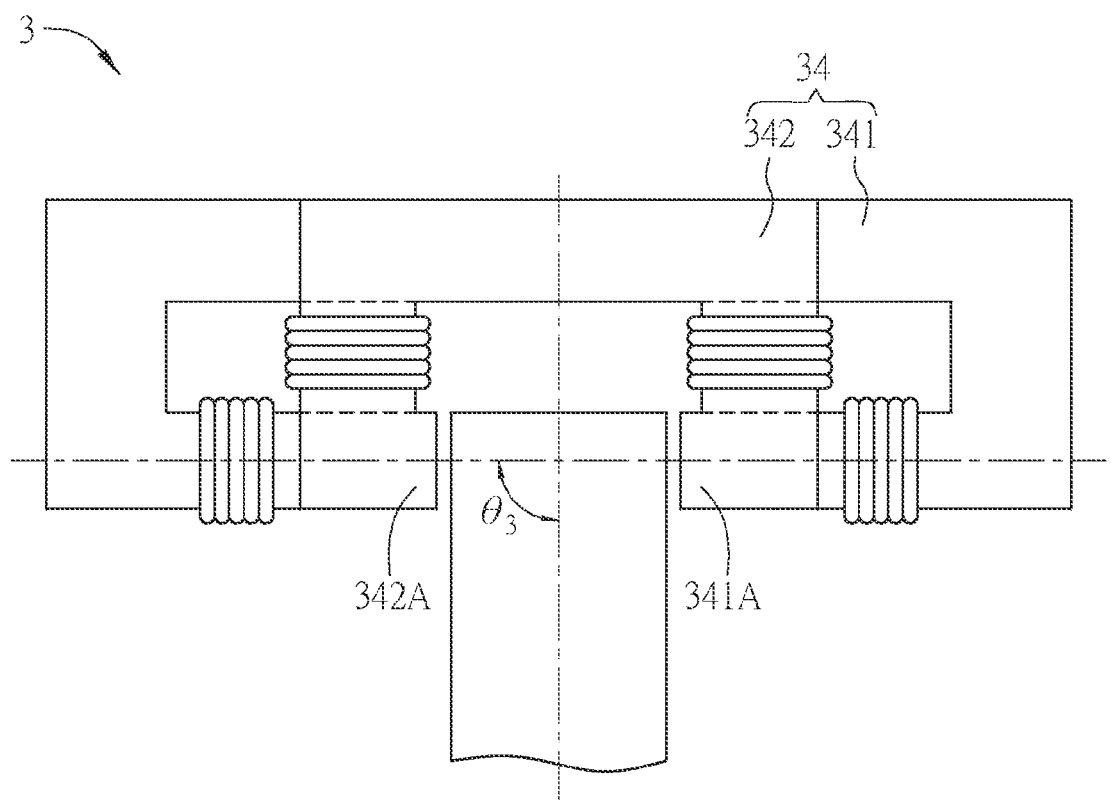
FIG. 3B is a front view of the stator of FIG. 3A.

FIG. 3A is a schematic diagram showing a stator 34 according to a third embodiment of the invention, and FIG. 3B is a front view of the stator 34 of FIG. 3A. To be noted, for clearly illustrating the third angle $\theta_3$, the second stator unit 342 is shown in the front in FIG. 3B, and the relative position between the first stator unit 341 and the second stator unit 342 is still the same.

Different from the second embodiment, the protruding directions of the front ends of the first tooth 341A of the first stator unit 341 and the third tooth 342A of the second stator unit 342 are the same. In the third embodiment, a protruding length L1 of the first tooth 341A of the first stator unit 341 is different from the protruding length L2 of the third tooth 342A of the second stator unit 342. In other words, the front ends of the first tooth 341A and the third tooth 342A have the same included angle (90 degrees) with the radial direction of the rotor (not shown), but the protruding lengths of the front edges of the first tooth 341A and the third tooth 342A are different.

The first tooth 341A of the first stator unit 341 is parallel to the third tooth 342A of the second stator unit 342. In more detail, the first tooth 341A is disposed opposite to the second tooth 341B, and the third tooth 342A is disposed opposite to the fourth tooth 342B. This configuration can be applied to the axial flux motor, and achieve the similar effect as the previous embodiment.

The other components and the relationships between the components of this embodiment are similar to the previous embodiments, so their detailed descriptions will be omitted.

Figure 4A:
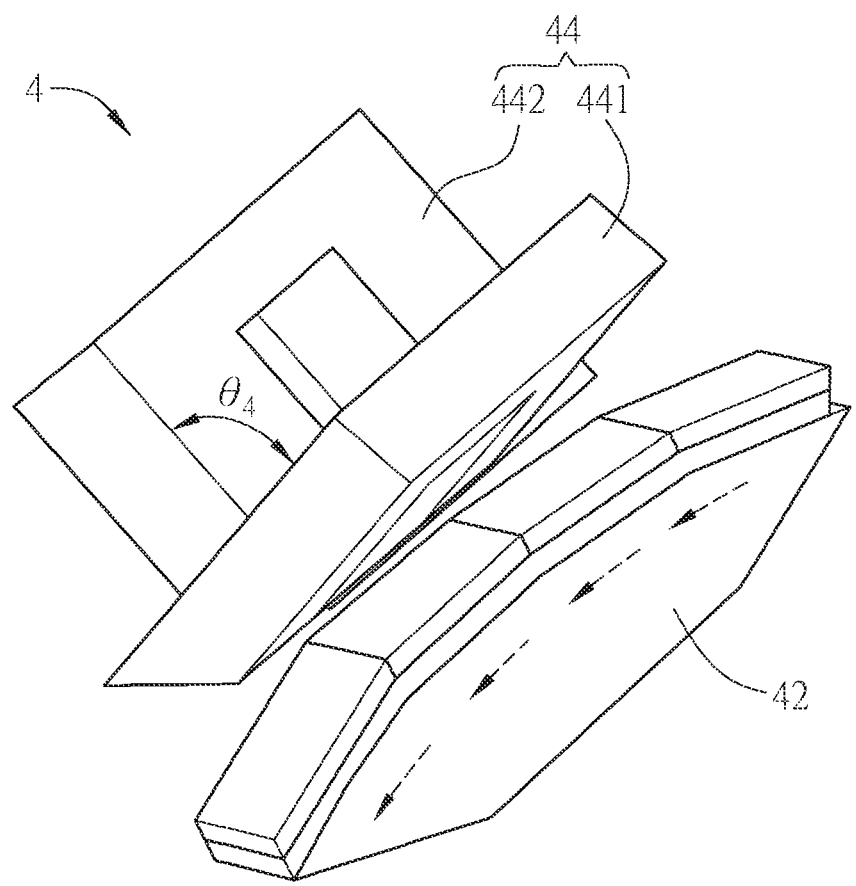
FIG. 4A is a schematic diagram showing a stator unit according to a fourth embodiment of the invention, which is applied to a radial flux motor.
Figure 4B:
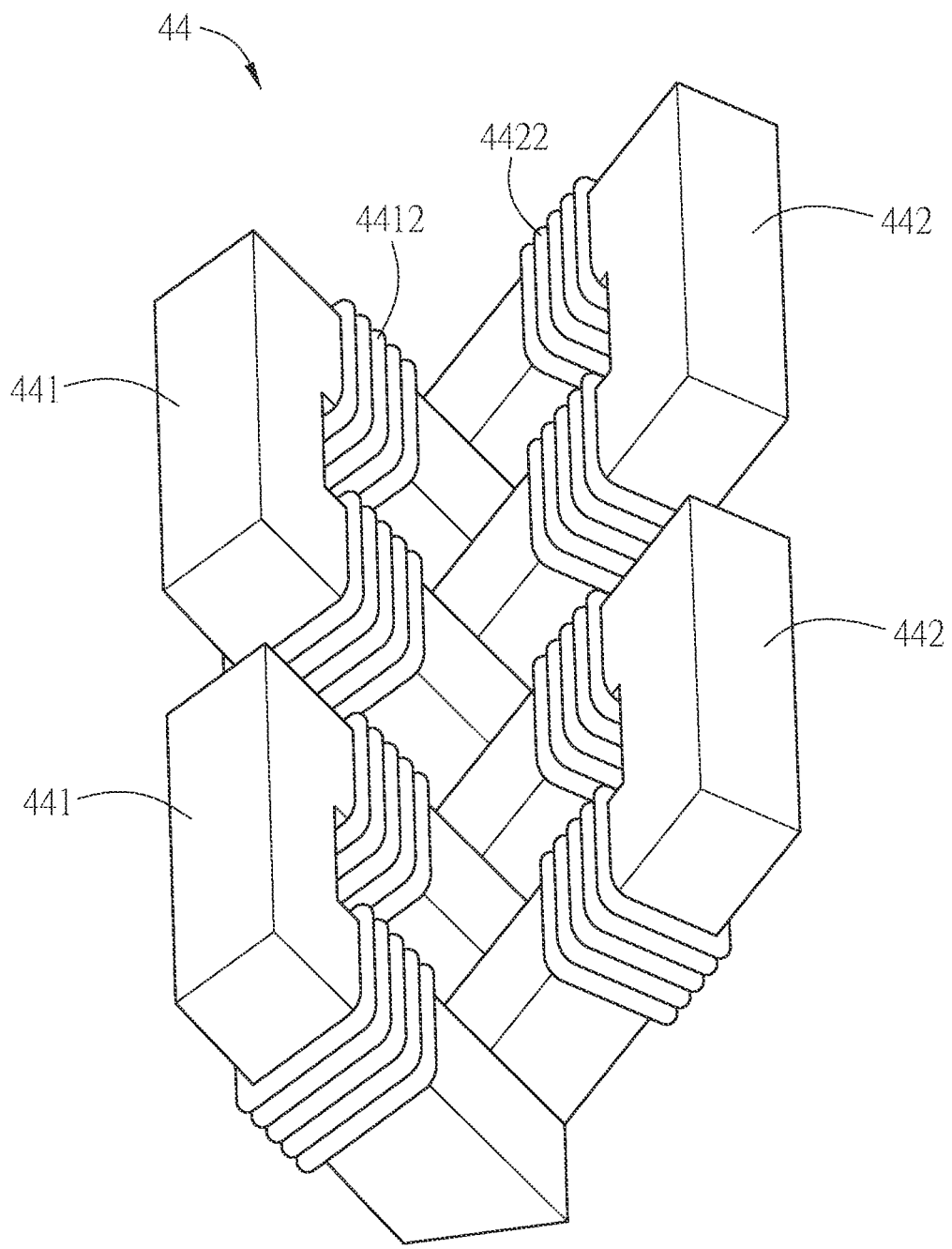
FIG. 4B is a schematic diagram showing a stator unit of FIG. 4A.
Figure 4C:
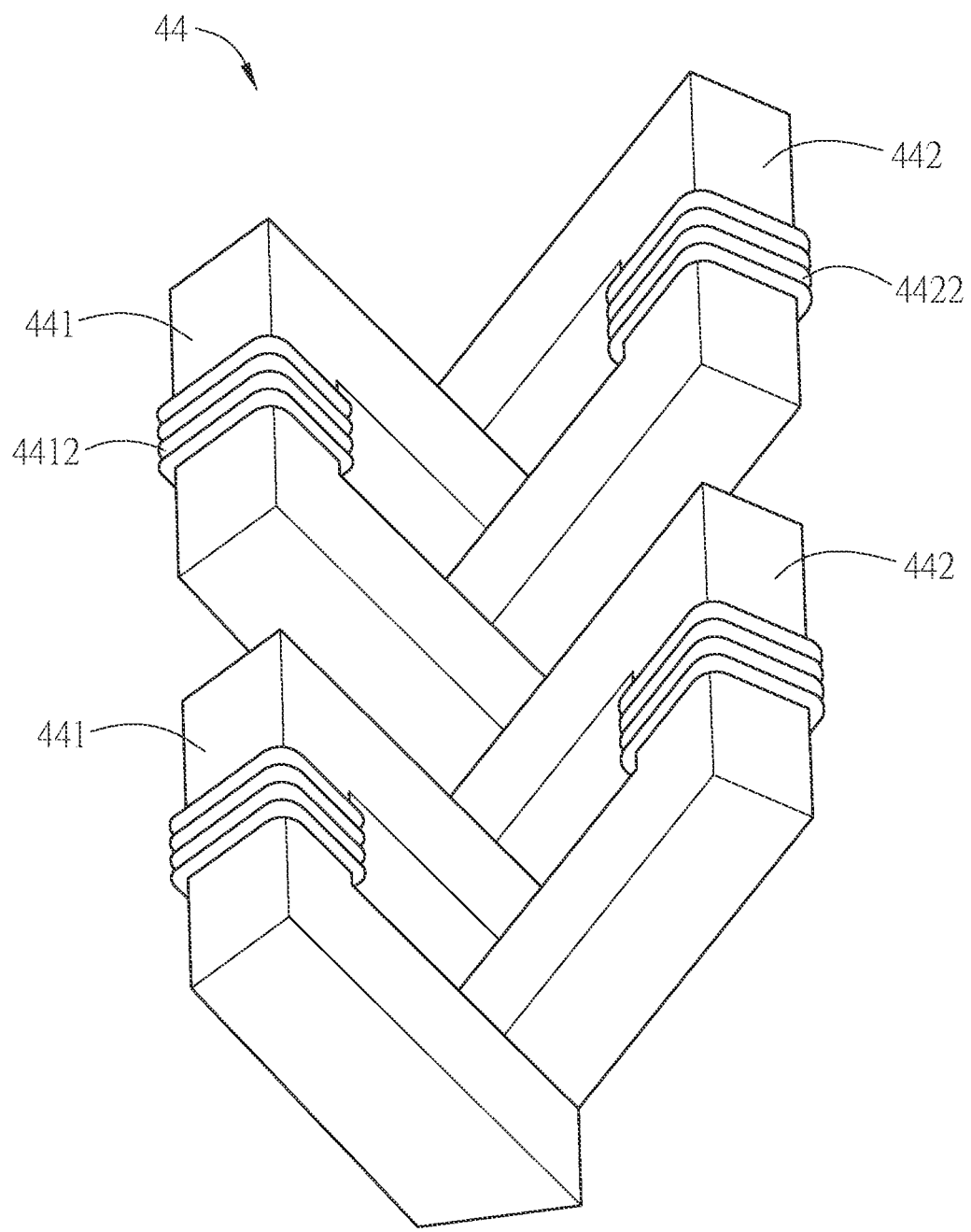
FIG. 4C is a schematic diagram showing another aspect of the stator unit applied to the radial flux motor.
Figure 4D:
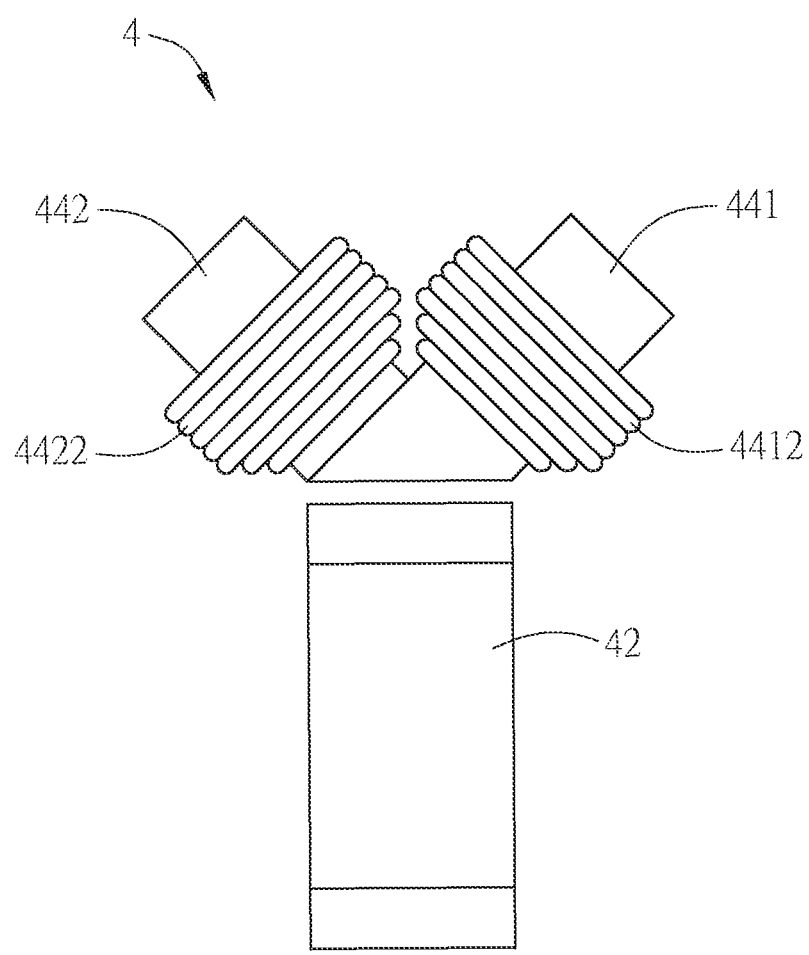
FIG. 4D is a front view showing another aspect of the stator unit applied to the radial flux motor.

FIGS. 4A to 4D show different aspects of the invention applied to radial flux motors. FIG. 4A is a schematic diagram showing a stator unit in cooperate with a rotor, which is applied to a radial flux motor, and FIG. 4B is a schematic diagram showing a stator unit of FIG. 4A. FIGS. 4C and 4D are schematic diagrams showing other aspects of the stator unit of the fourth embodiment applied to the radial flux motor.

Referring to FIG. 4A, the first stator unit 441 and the second stator unit 442 are adjacently disposed to each other along a rotating direction or a moving direction (see the arrow direction) of the rotor 42, and the teeth of the first stator unit 441 and the second stator unit 442 are alternately disposed. In this embodiment, the first stator unit 441 and the second stator unit 442 have an overturned-U shape (or a U shape for outer rotor motors). This embodiment can be applied to a radial motor, but this invention is not limited thereto.

Similar to the second embodiment, the protruding directions of the adjacent first and third teeth are different. Different from the second and third embodiments, the first stator unit 441 and the second stator unit 442 have different included angles with the radial direction of the rotor 42, and the teeth of two stator units form an angle $\theta_4$. The angle $\theta_4$ is preferably between 0 and 180 degrees. Besides, the protruding directions of the first and second teeth (not shown) of the first stator unit 441 are the same (they have the same included angle with the radial direction of the rotor). The protruding directions of the third and fourth teeth (not shown) of the second stator unit 442 are also the same. Only the end portions of the teeth of the first stator unit 441 and the second stator unit 442 are substantially disposed adjacently, or contacted.

FIGS. 4B to 4D show the stator unit of the fourth embodiment in cooperate with different coil winding types.

Referring to FIG. 4B, two teeth of the first stator unit 441 are wound with two coils 4412, and two teeth of the second stator unit 442 are wound with two coils 4422. In FIG. 4C, the first stator unit 441 is wound with a single coil 4412, and the second stator unit 442 is wound with a single coil 4422. FIG. 4D shows another coil winding type. Herein, the coils 4412 and 4422 are wound in tapered shape. On the same stator unit, the tapered coil winding can increase the magnetic flux of the entire stator unit and more efficiently utilize the available space. Thus, it is possible to use a smaller stator to provide the same effect as the conventional stator, thereby achieving the goal of minimization of the electric machine.

Figure 4E:
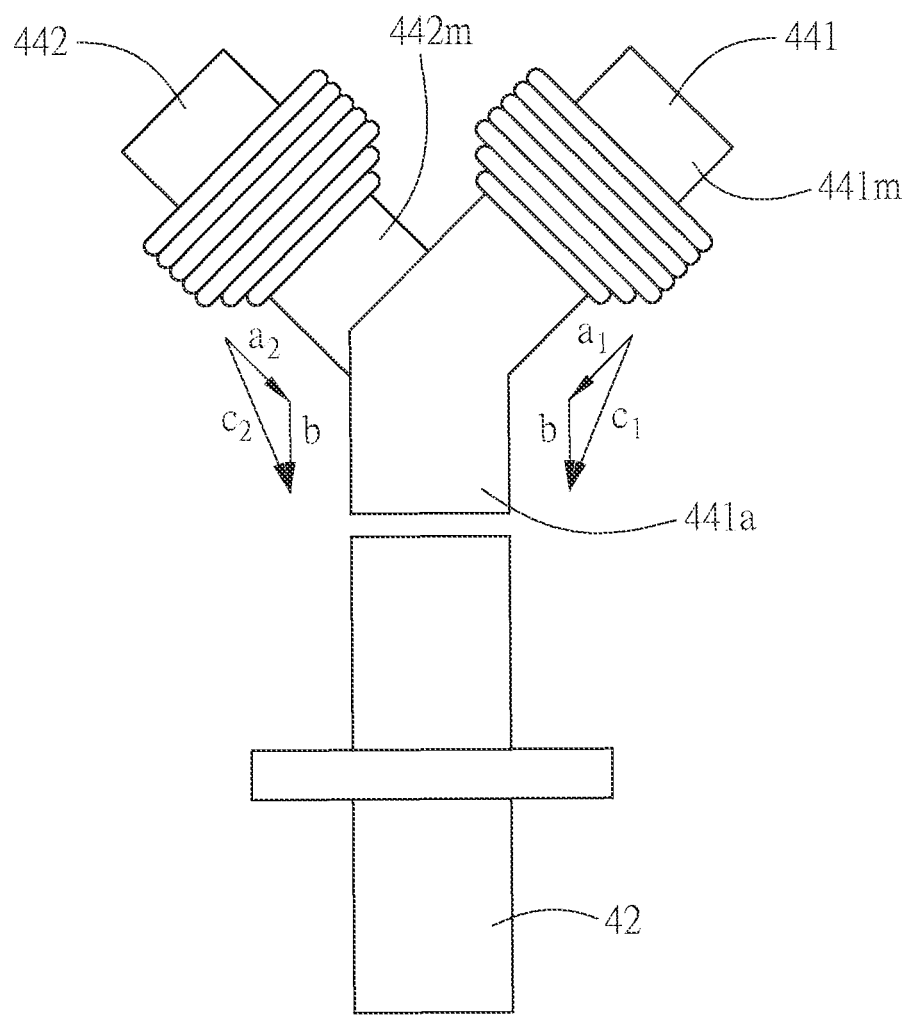
FIG. 4E is a front view showing another aspect of the stator unit applied to the radial flux motor.

FIG. 4E is a front view showing another aspect of the stator unit of the fourth embodiment. In FIG. 4E, the first stator unit 441 and the second stator unit 442 have the same shape, and they are adjacently and alternately disposed to each other.

To be noted, this embodiment is different from the previous embodiments in that the protruding direction of the tooth is defined as the vector sum of the protruding directions of the yoke body 441m of each stator unit and the tooth 441a extending from the yoke body 441m.

In more specific, the yoke body 441m of the first stator unit 441 has a protruding direction a1, the tooth 441a has a protruding direction b, and the protruding directions a1 and b have a vector sum c1. Similarly, the yoke body 442m of the second stator unit 442 has a protruding direction a2, the tooth (not shown) has a protruding direction b, and the protruding directions a2 and b have a vector sum c2. Accordingly, the vector sums c1 and c2 are the substantial protruding directions of the teeth of the first stator unit 441 and the second stator unit 442, and c1 and c2 are different. In other words, the substantial protruding directions c1 and c2 of the teeth of the first stator unit 441 and the second stator unit 442 have different first angle and third angle with the radial direction of the rotor 42.

Figure 4F:
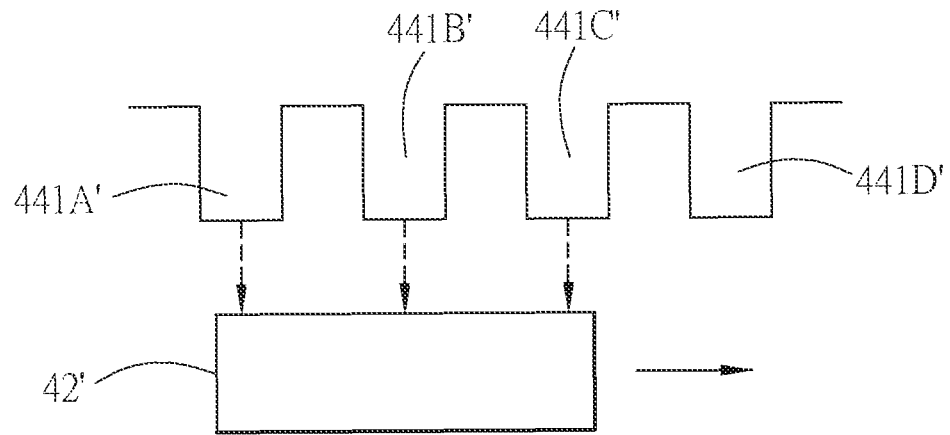
FIGS. 4F and 4G are schematic diagrams showing the magnetic flux surface change as the sector of the rotor of the conventional electric machine moves.
Figure 4G:
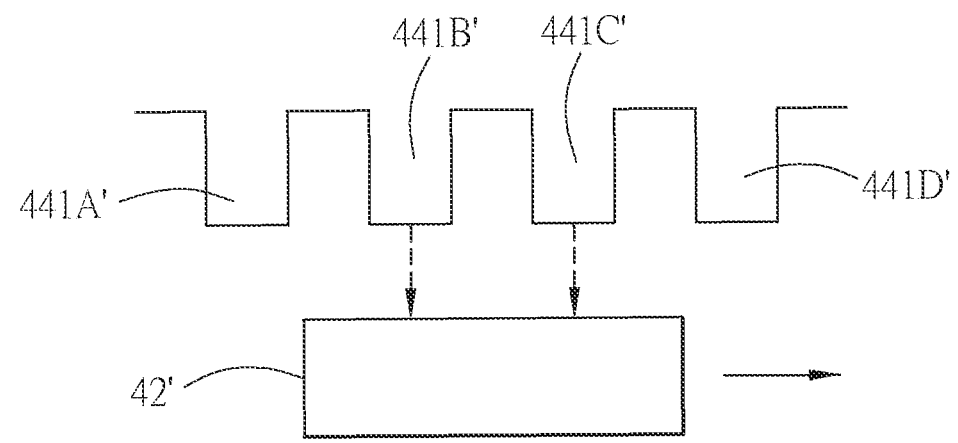

FIGS. 4F and 4G are schematic diagrams showing the relationships between the rotor 42' and the teeth 441A', 441B', 441C' and 441D' of the conventional electric machine. For the sake of clear illustration, the rotor 42' of the conventional electric machine is shown as a rectangular magnet. This is not to limit the shape of the rotor, and those skilled persons can understand from the figures. In FIG. 4F, the rotor 42' and the teeth 441A', 441B' and 441C' have a non-continuous effective vertical magnetic flux surface. When the rotor 42' moves for a distance of the width of a tooth along the arrow direction as shown in FIG. 4G, the effective vertical magnetic flux surface is created between the rotor 42' and two teeth 441B' and 441C'. In brief, the size of the effective vertical magnetic flux surface is changed as the rotor 42' moves.

Figure 4H:
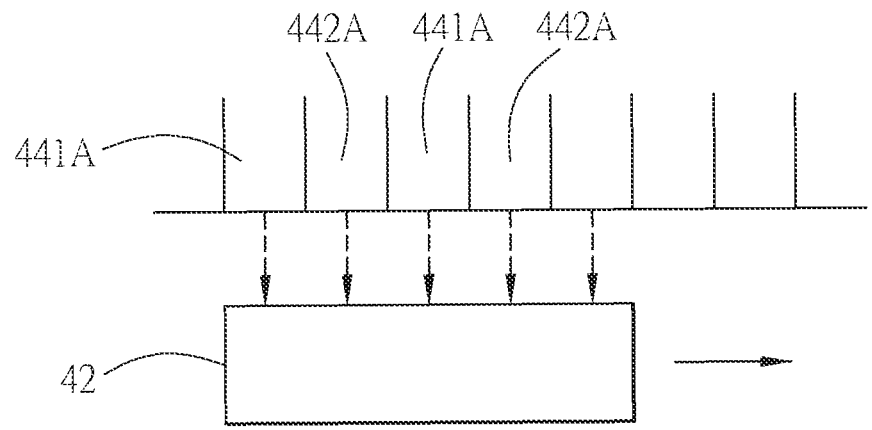
FIGS. 4H and 4I are schematic diagrams showing the magnetic flux surface change as the sector of the rotor of the electric machine of the invention moves.
Figure 4I:
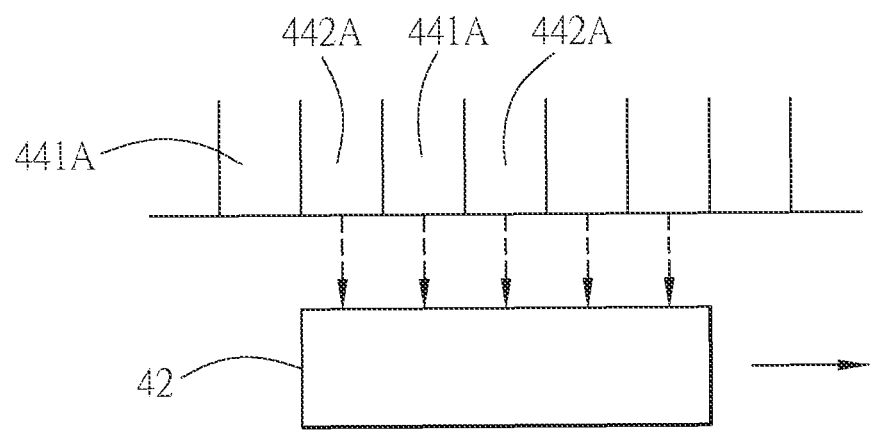

FIGS. 4H and 4I show an embodiment of the invention, wherein the teeth are tightly arranged. For the sake of clear illustration, other parts of the stator units are omitted. When the magnet of the rotor 42 is at the position as shown in FIG. 4H, the effective vertical magnetic flux surface substantially has a width of five teeth (across three first teeth 441A and two third teeth 442A). When the rotor continuously moves along the arrow, as shown in FIG. 4I, the effective vertical magnetic flux surface still keeps a width of five teeth (across two first teeth 441A and three third teeth 442A). As a result, the area of the effective vertical magnetic flux surface of this embodiment does not change as the rotor 42 moves.

The other components and the relationships between the components of this embodiment are similar to the previous embodiments, so their detailed description will be omitted.

Figure 5:
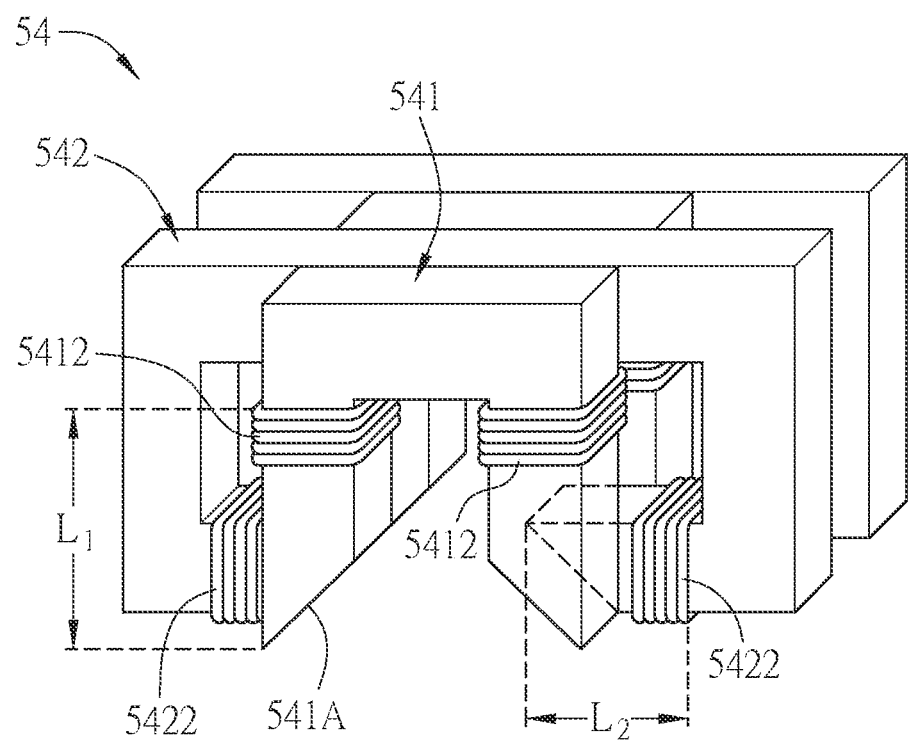
FIG. 5 is a schematic diagram showing a stator according to a fifth embodiment of the invention.

FIG. 5 is a schematic diagram showing a stator 54 according to a fifth embodiment of the invention. Similar to the second embodiment, the substantial protruding direction of the first tooth 541A of the first stator unit 541 is different from the substantial protruding direction of the third tooth (not shown) of the second stator unit 542. Accordingly, the first stator unit 541 and the second stator unit 542 of this embodiment have different protruding directions of their teeth and different shapes thereof. To be noted, in the above-mentioned first to fourth embodiments, the first stator unit and the second stator unit have the same or similar shape and size. Under the configuration of the fifth embodiment, it is possible to provide the similar effect as the previous embodiments.

The other components and the relationships between the components of this embodiment are similar to the previous embodiments, so their detailed description will be omitted.

Figure 6A:
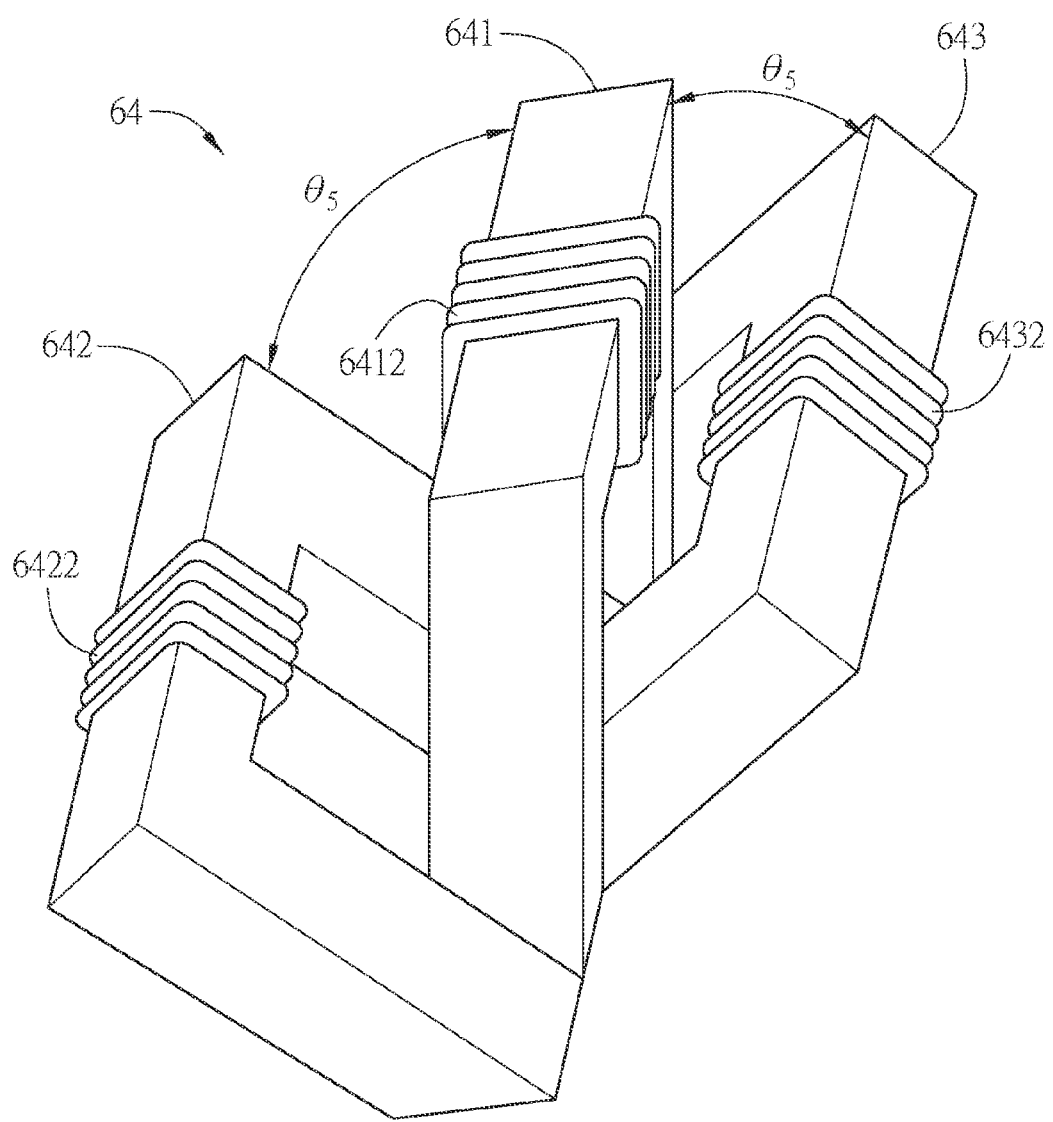
FIG. 6A is a schematic diagram showing a stator according to a sixth embodiment of the invention.
Figure 6B:
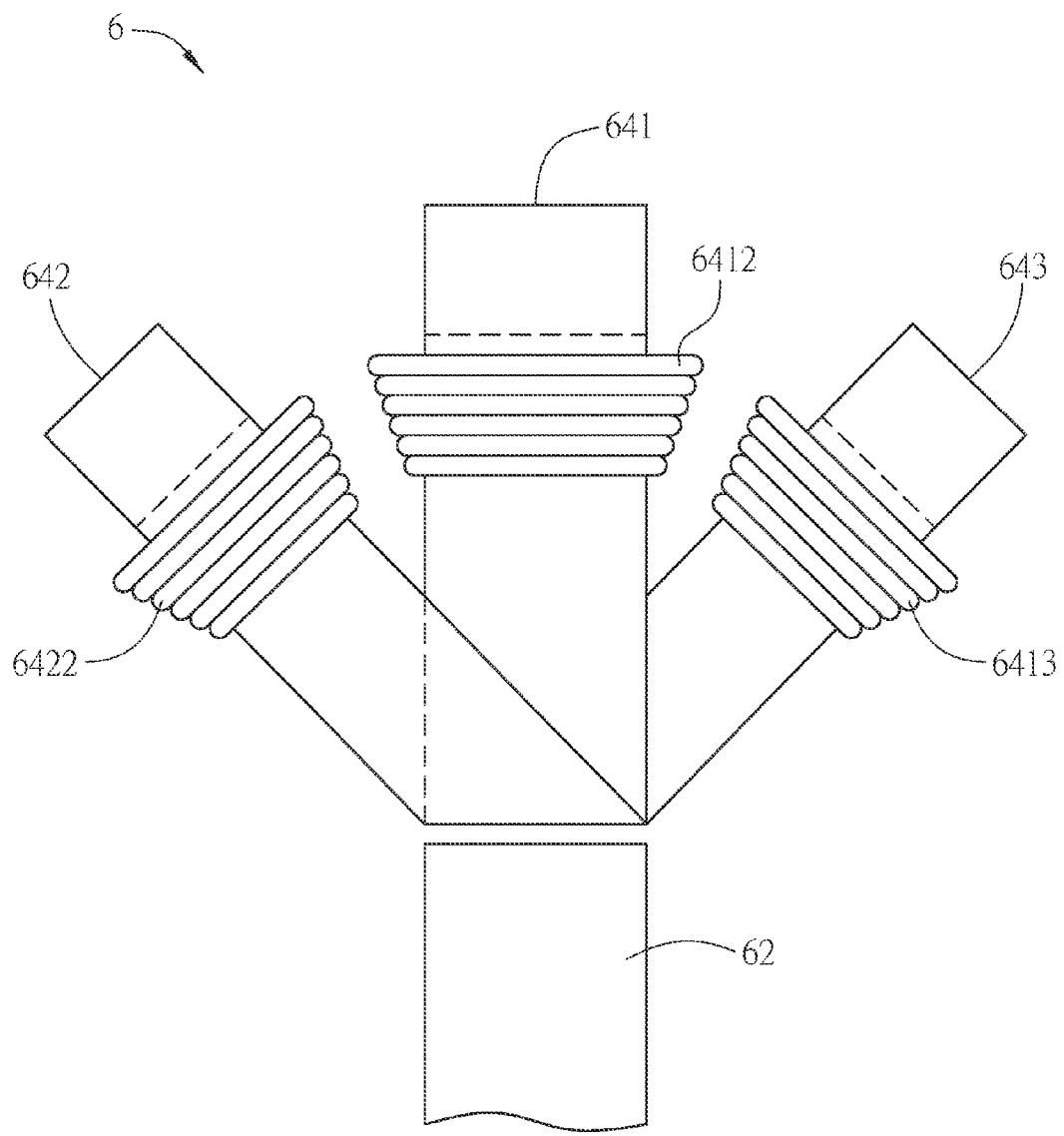
FIG. 6B is a front view showing another aspect of the stator according to the sixth embodiment of the invention.

FIGS. 6A and 6B are schematic diagrams showing two aspects of a stator according to a sixth embodiment of the invention.

Different from the above embodiments, the electric machine 6 of the sixth embodiment includes a first stator unit 641 and two second stator units 642 and 643. The first stator unit 641 and any of the second stator units 642 and 643 are adjacently and alternately disposed to each other along a rotating direction or a moving direction of the rotor 62. In brief, the stator of this embodiment is composed of three stator units, and the adjacent two stator units have an included angle $\theta_5$. As shown in the figures, the included angles between the first stator unit 641 and the second stator unit 642 and between the first stator unit 641 and the second stator unit 643 are the same. However, this invention is not limited thereto. Besides, this embodiment discloses three stator units configured at different directions, but this invention is not limited. Of course, it is also possible to configure a plurality of stator units at four or more different directions.

Similar to the fourth embodiment, the protruding directions of the first and second teeth of the first stator unit 641 are the same (that is, the first and second teeth have the same included angle with the radial direction of the rotor 62), and the front ends of the teeth are coplanar. Although this embodiment shows three coils 6412, 6422 and 6432 winding on the center sections of the first stator unit 641 and two second stator units 642 and 643, respectively, it is also possible to configure two coils on a single stator unit as shown in FIG. 4B. Besides, it is also possible to wind the coil in tapered shape as shown in FIG. 6B.

The other components and the relationships between the components of this embodiment are similar to the previous embodiments, so their detailed description will be omitted.

Figure 7:
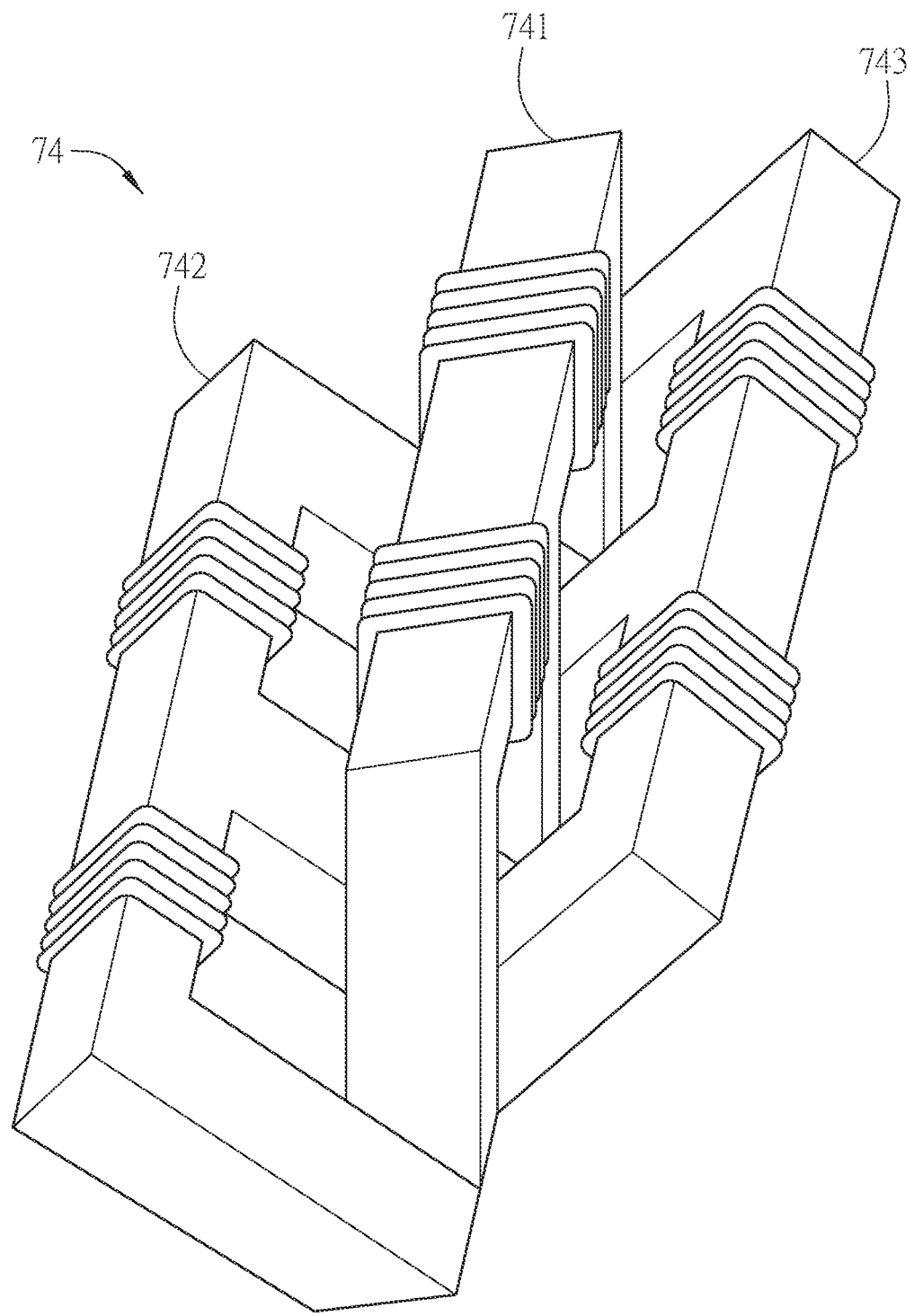
FIG. 7 is a schematic diagram showing a stator according to a seventh embodiment of the invention.

FIG. 7 is a schematic diagram showing a stator 74 according to a seventh embodiment of the invention. Referring to FIG. 7, similar to the above sixth embodiment, the stator 74 is composed of three stator units, including a first stator unit 741 and two second stator units 742 and 743. Different from the above sixth embodiment, the magnetic yoke of the seventh embodiment has an E shape instead of a U shape of the sixth embodiment. The other components, the relative positions of the components and the generated effect of this embodiment are similar to the previous embodiments, so the detailed descriptions thereof will be omitted.

Figure 8A:
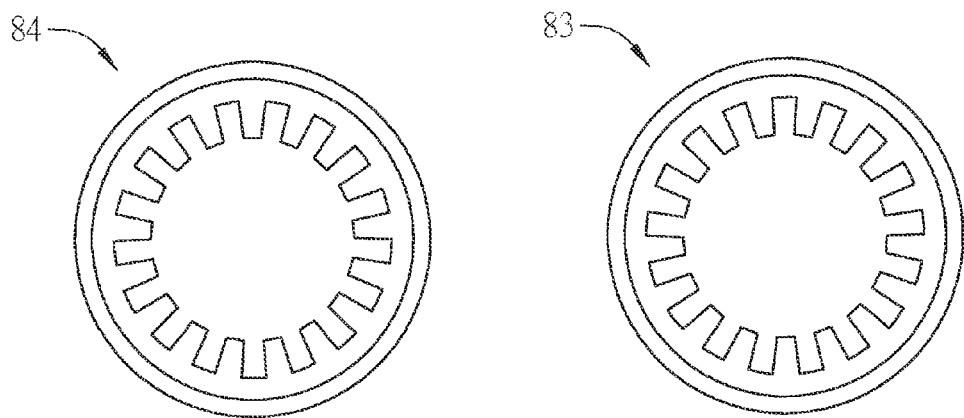
FIG. 8A is a top view of two circular stator units according to an eighth embodiment of the invention.
Figure 8B:
FIG. 8B is a side view of the two circular stator units of FIG. 8A.
Figure 8C:
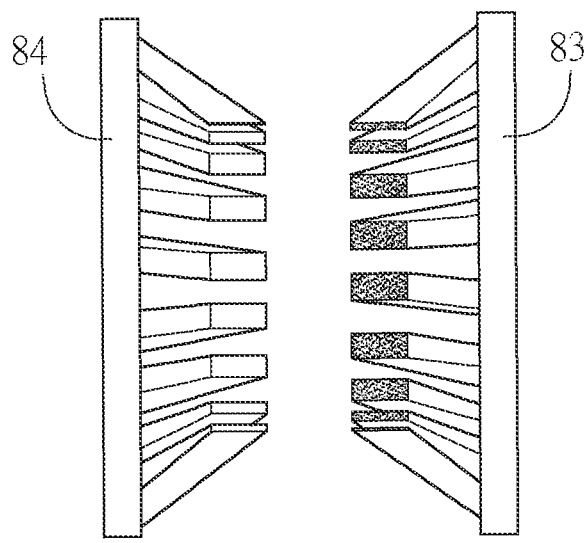
FIG. 8C is a sectional view of the two circular stator units of FIG. 8A.
Figure 8D:
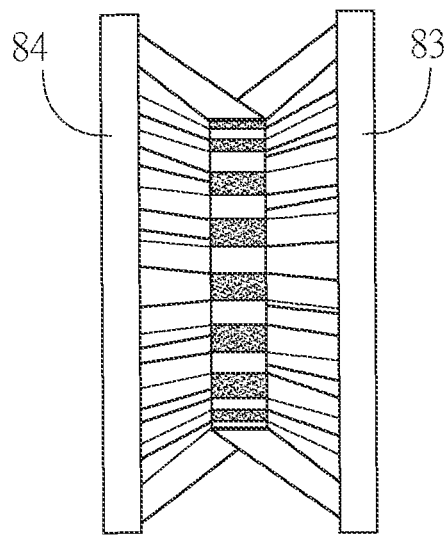
FIG. 8D is a sectional view of the assembly of the two circular stator units of FIG. 8C.

FIG. 8A is a top view of two circular stator units 83 and 84 according to an eighth embodiment of the invention, FIG. 8B is a side view of the two circular stator units 83 and 84 of FIG. 8A, FIG. 8C is a sectional view of the two circular stator units 83 and 84 of FIG. 8A, and FIG. 8D is a sectional view of the assembly of the two circular stator units 83 and 84 of FIG. 8B.

In this embodiment, the first stator unit 83 and the second stator unit 84 are two independent circular magnetic yoke, and the yoke bodies of the two stator units have a plurality of teeth, which are disposed toward the center, extend outwardly along the axial direction, and have a slant angle. Besides, the first stator unit 83 and the second stator unit 84 are misaligned oppositely and interlaced, so that the ends of the teeth thereof are adjacently and alternately disposed. Thus, the end surfaces of the teeth can form a closed and circular continuous magnetic flux surface. FIG. 8C is a sectional view of the circular magnetic yokes, and FIG. 8D is a sectional view of the assembly of the two circular stator units of FIG. 8C, wherein the ends of the teeth of the two magnetic yokes are adjacently and alternately disposed so as to form a semicircular continuous magnetic flux surface.

For the sake of easy understanding, the coils of this embodiment are all omitted in the figures. In practice, the coils can be wound on the teeth, or be wound in advance and then mounted on the teeth, thereby achieving similar effect as the previous embodiments. The other components and the relationships between the components of this embodiment are similar to the previous embodiments, so their detailed description will be omitted.

Figure 9A:
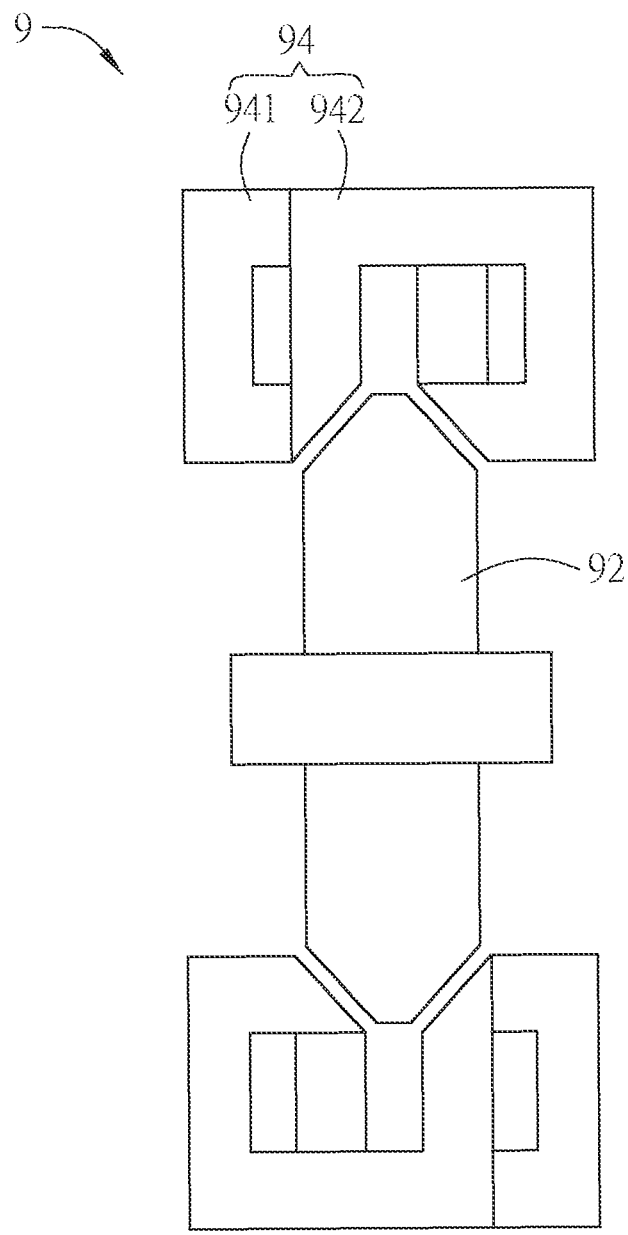
FIG. 9A is a schematic diagram showing the stator of the invention in cooperate with an inner rotor.
Figure 9B:
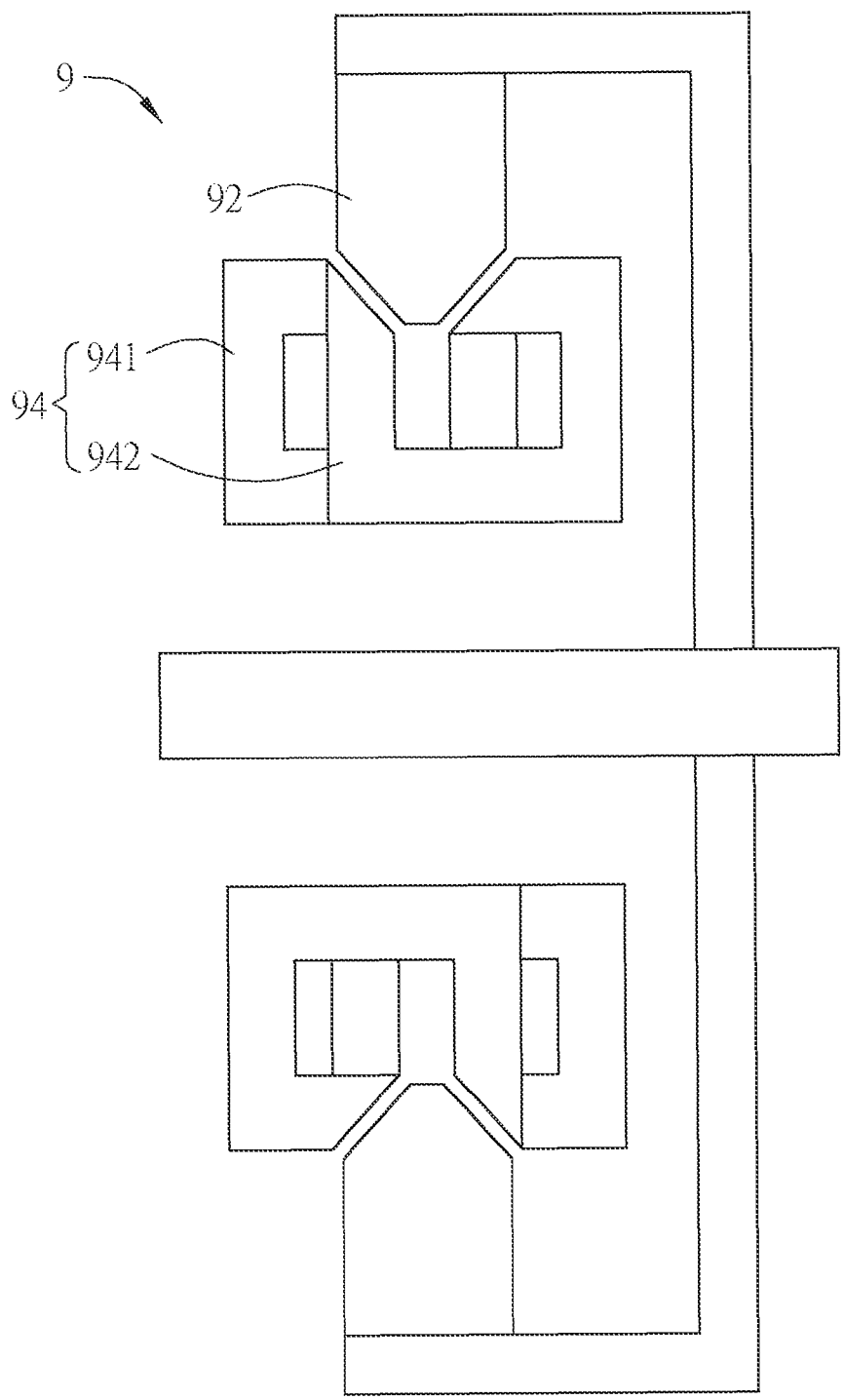
FIG. 9B is a schematic diagram showing the stator of the invention in cooperate with an outer rotor.
Figure 9C:
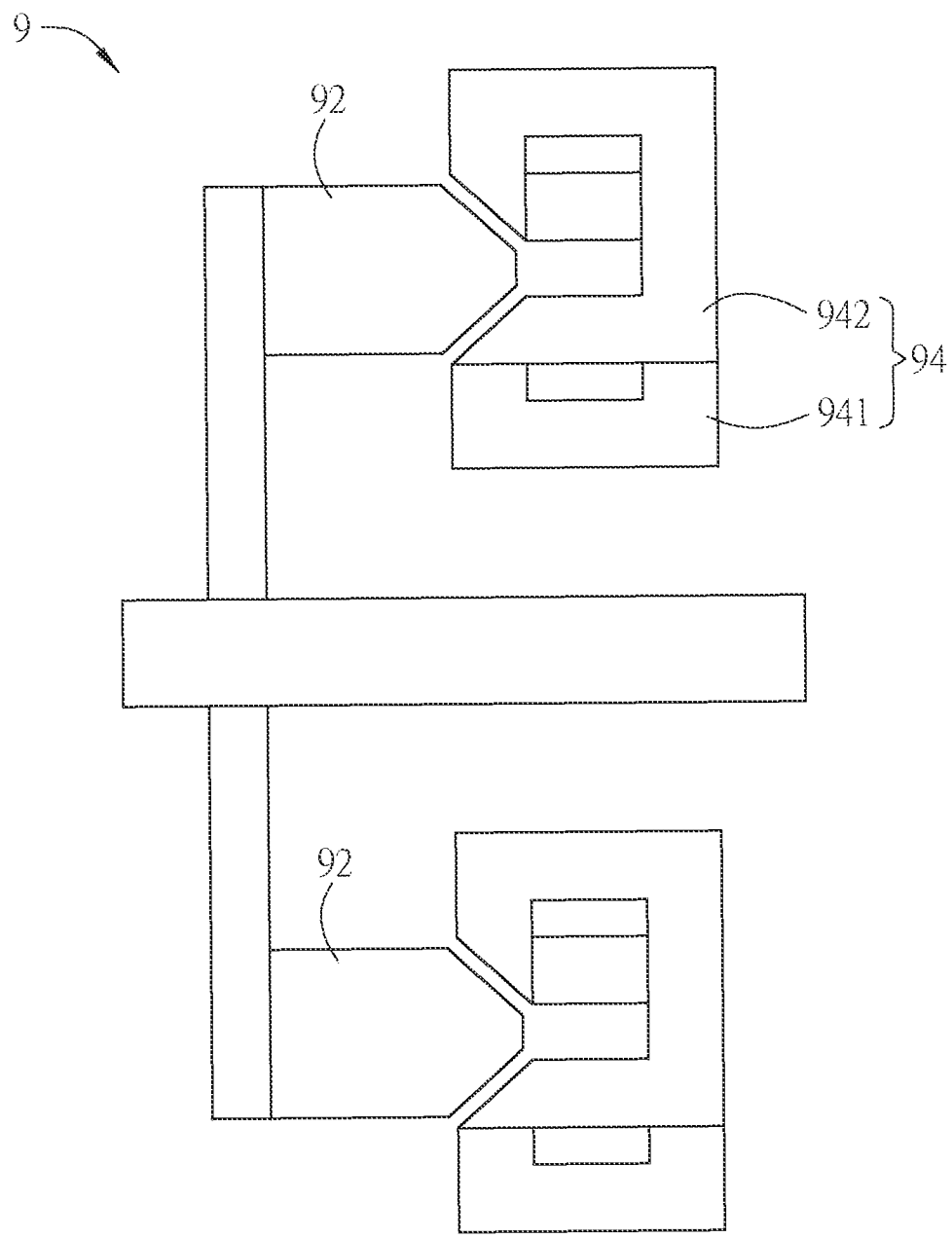
FIG. 9C is a schematic diagram showing the stator of the invention in cooperate with a lateral rotor.
Figure 9D:
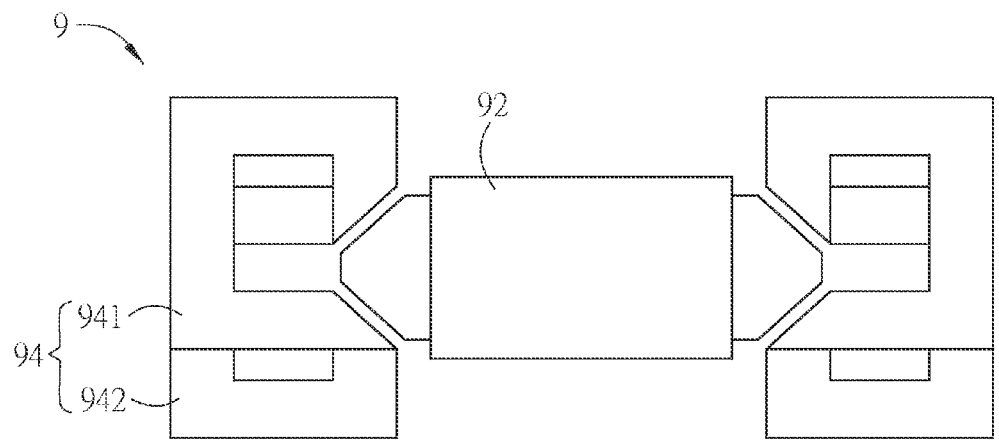
FIG. 9D is a schematic diagram showing an electric machine of the invention, which is a linear motor.
Figure 9E:
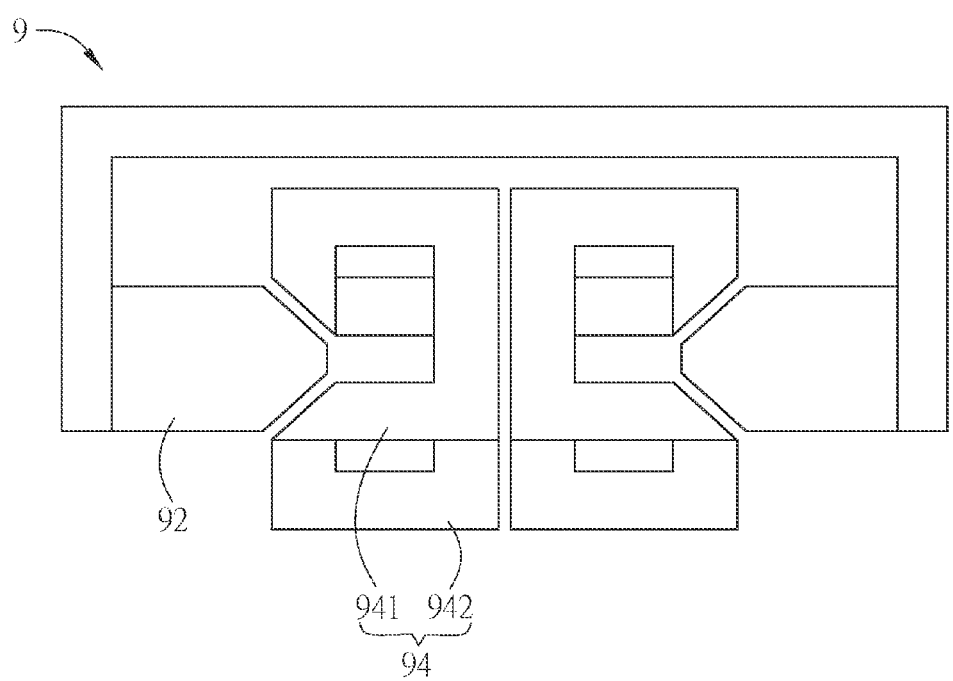
FIG. 9E is a schematic diagram showing an electric machine of the invention, which is a linear motor.

FIG. 9A is a schematic diagram showing the stator 94 of the invention in cooperate with an inner rotor 92, FIG. 9B is a schematic diagram showing the stator 94 of the invention in cooperate with an outer rotor 92, and FIG. 9C is a schematic diagram showing the stator 94 of the invention in cooperate with a lateral rotor 92. FIG. 9D is a schematic diagram showing the stator 94 of the invention in cooperate with an outer rotor 92 and applied to a linear motor. Herein, the rotor 92 has a long strip shape. FIG. 9E is a schematic diagram showing the stator 94 of the invention in cooperate with an inner rotor 92 and applied to a linear motor. Herein, the rotor 92 has a long strip shape. Although not shown, the present invention can also be applied to permanent magnet motor, reluctance motor or induction motor.

To be noted, for the sake of easy understanding, the other components of the electric machine of the invention are not shown in the figures, but those skilled persons can still understand the invention and use it. The first stator unit 941 and the second stator unit 942 of the stator 94 can be any illustrated in the above embodiments, and they are not limited to the figures. Although the disclosed embodiments use a motor as an example, those skilled persons can understand that this invention can also be applied to a generator.

In summary, the stators of the invention are composed of independent stator units, which are separately fabricated and wound with coils during assembling processes. This configuration can decrease the assembling cost, simplify the structure and improve the manufacturing speed. Furthermore, the stator units are adjacently and alternately arranged and there is no gap between the teeth. Thus, the stator slot opening is eliminated, so that the cogging torque effect and the magnetic loss can be minimized, thereby improving the efficiency of the electric machine.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electric machine, comprising:
    a rotor; and
    a stator disposed near to the rotor, wherein the stator comprises at least a first stator unit and at least a second stator unit, the first stator unit has a first body, at least a first coil, a first tooth and a second tooth, the first tooth and the second tooth are protruded from the first body, the first coil is wound on at least one of the first tooth, the second tooth or the first body, the second stator unit has a second body, at least a second coil, a third tooth and a fourth tooth, the third tooth and the fourth tooth are protruded from the second body, and the second coil is wound on at least one of the third tooth, the fourth tooth or the second body;
    wherein, the rotor has a rotating direction or a moving direction with respect to the stator, the first tooth and the third tooth are adjacently disposed to each other along the rotating direction or the moving direction, the substantial protruding directions of the first tooth and the third tooth respectively form a first angle and a third angle with a radial direction of the rotor, and the first angle and the third angle are different;
    wherein, the second tooth and the fourth tooth are disposed adjacently along the rotating direction or the moving direction, and when the rotor rotates or moves, the effective vertical magnetic flux area and a magnetic flux exchange between the rotor and the teeth of the stator substantially remains unchanged, and there is no coil installed in a portion of the teeth facing the adjacent teeth of the stator.

2. The electric machine of claim 1, wherein the relative position of the first coil with respect to the radial direction of the rotor is different from the relative position of the second coil with respect to the radial direction of the rotor.

3. The electric machine of claim 1, wherein the front ends of the first tooth and the third tooth form a continuous magnetic flux surface.

4. The electric machine of claim 1, wherein when the electric machine has a plurality of the first stator units and a plurality of the second stator units, the first teeth and third teeth are alternately disposed.

5. An electric machine, comprising:
    a rotor; and
    a stator disposed near to the rotor, wherein the stator comprises at least a first stator unit and at least a second stator unit disposed adjacent to each other, the first stator unit has a first body, at least a first coil, a first tooth and a second tooth, the first tooth and the second tooth are protruded from the first body, the first coil is wound on at least one of the first tooth, the second tooth or the first body, the second stator unit has a second body, at least a second coil, a third tooth and a fourth tooth, the third tooth and the fourth tooth are protruded from the second body, and the second coil is wound on at least one of the third tooth, the fourth tooth or the second body;
    wherein, the rotor has a rotating direction or a moving direction with respect to the stator, the first tooth and the third tooth are adjacently disposed to each other along the rotating direction or the moving direction, and the shapes of the first stator unit and the second stator unit or the protruding lengths of the first tooth and the third tooth are different;
    wherein, the second tooth and the fourth tooth are disposed adjacently along the rotating direction or the moving direction, and when the rotor rotates or moves, the effective vertical magnetic flux area and a magnetic flux exchange between the rotor and the teeth of the stator substantially remains unchanged, and there is no coil installed in a portion of the teeth facing the adjacent teeth of the stator.

6. The electric machine of claim 5, wherein the relative position of the first coil with respect to the radial direction of the rotor is different from the relative position of the second coil with respect to the radial direction of the rotor.

7. The electric machine of claim 5, wherein the front ends of the first tooth and the third tooth form a continuous magnetic flux surface.

8. The electric machine of claim 5, wherein when the electric machine has a plurality of the first stator units and a plurality of the second stator units, the first teeth and the third teeth are alternately and adjacently disposed.

9. An electric machine, comprising:
    a rotor; and
    a stator disposed near to the rotor, wherein the stator comprises at least a first stator unit and at least a second stator unit disposed adjacent to each other;
    wherein, the rotor has a rotating direction or a moving direction with respect to the stator, and the first stator unit and the second stator unit are misaligned and adjacently disposed to each other along the rotating direction or the moving direction;
    wherein, each of the stator units comprises at least two teeth, and when the rotor rotates or moves, the effective vertical magnetic flux area and a magnetic flux exchange between the rotor and the teeth of the stator substantially remains unchanged, and there is no coil installed in a portion of the teeth facing the adjacent teeth of the stator.

10. The electric machine of claim 9, wherein the first stator unit comprises at least a first coil, the second stator unit comprises at least a second coil, and the relative position of the first coil with respect to the radial direction of the rotor is different from the relative position of the second coil with respect to the radial direction of the rotor.

11. The electric machine of claim 9, wherein when the electric machine has a plurality of the first stator units and a plurality of the second stator units, the first teeth and the third teeth are alternately disposed.

* * * * *